United States Patent
Kao et al.

(10) Patent No.: US 9,320,068 B2
(45) Date of Patent: Apr. 19, 2016

(54) INFORMATION EXCHANGE METHOD AND INFORMATION EXCHANGE SYSTEM

(75) Inventors: Meng-Chao Kao, New Taipei (TW);
Hui-Chen Lin, New Taipei (TW);
Po-Hsu Chen, New Taipei (TW);
Ching-Nan Lin, New Taipei (TW);
Chien-Yeh Hsu, New Taipei (TW);
Cheng-Wei Lin, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 870 days.

(21) Appl. No.: 13/571,368

(22) Filed: Aug. 10, 2012

(65) Prior Publication Data

US 2013/0282306 A1     Oct. 24, 2013

(30) Foreign Application Priority Data

Apr. 20, 2012    (TW) ............................... 101114190 A (51) Int. Cl.
  *G01B 5/00*         (2006.01)
  *H04W 76/02*    (2009.01)
(52) U.S. Cl.
  CPC ................................ *H04W 76/023* (2013.01)
(58) Field of Classification Search
  CPC ......... H04B 1/0458; G07C 11/00; H03D 1/00
  See application file for complete search history.

(56) References Cited

U.S. PATENT DOCUMENTS

| | | |
|---|---|---|
| 7,092,670 B2 | 8/2006 | Tanaka |
| 7,988,037 B2 | 8/2011 | Yach |
| 2005/0149560 A1 | 7/2005 | Lin |
| 2006/0135084 A1* | 6/2006 | Lee .................................. 455/78 |
| 2007/0188323 A1 | 8/2007 | Sinclair |
| 2009/0034591 A1 | 2/2009 | Julian |
| 2012/0011932 A1 | 1/2012 | Nakagawa |
| 2012/0075439 A1* | 3/2012 | Gong et al. ..................... 348/61 |
| 2014/0224017 A1 | 8/2014 | Kanemoto |

FOREIGN PATENT DOCUMENTS

| | | |
|---|---|---|
| TW | 548631 | 8/2003 |
| TW | I225613 | 12/2004 |
| TW | 200913550 | 3/2009 |
| TW | 201017134 | 5/2010 |
| TW | 201121501 | 7/2011 |
| TW | 201200876 | 1/2012 |
| TW | 201209653 | 3/2012 |
| WO | 0116940 A1 | 3/2001 |

OTHER PUBLICATIONS

Studer et al., 'Don't Bump, Shake on It: The Exploitation of a Popular Accelerometer-Based Smart Phone Exchange and Its Secure Replacement', Dec. 2011, Carnegie Mellon University, pp. 1-10.*
Office action mailed on Nov. 14, 2014 for the China application No. 201210158636.X, p. 3 line 4~28, p. 4 and p. 5 line 1~17.
Office action mailed on Aug. 11, 2014 for the Taiwan application No. 101114190, filed: Apr. 20, 2012, p. 2~5, p. 6 line 1~10 and line 16~26, p. 7, page 8 line 1~2 and line 8~26, p. 9 and p. 10 line 1~9.

* cited by examiner

*Primary Examiner* — Elias Desta
(74) *Attorney, Agent, or Firm* — Winston Hsu; Scott Margo (57) ABSTRACT

An information exchange method includes steps of shaking a first electronic device and a second electronic device simultaneously; recording a first vibration waveform of the first electronic device and recording a second vibration waveform of the second electronic device; determining whether the first vibration waveform and the second vibration waveform match each other; and transmitting a first information related to the first electronic device to the second electronic device when the first vibration waveform and the second vibration waveform match each other.

19 Claims, 9 Drawing Sheets

INFORMATION EXCHANGE METHOD AND INFORMATION EXCHANGE SYSTEM

BACKGROUND OF THE INVENTION

1. Field of the Invention

The invention relates to an information exchange method and an information exchange system and, more particularly, to an information exchange method and an information exchange system capable of exchanging information promptly by shaking two electronic devices simultaneously.

2. Description of the Prior Art

In general, people usually exchange business cards to obtain contact information from each other in many occasions. The conventional business cards have many shortcomings, such as easily to be lost or damaged. As various electronic devices become more and more popular (e.g. smart phone, personal digital assistant, etc.), the conventional business cards can be converted into digital business cards already and further stored in the electronic devices. However, the operation is usually complicated and inconvenient when using the electronic devices to exchange digital business cards in an occasion with lots of people, such as large conference, party and so on. Therefore, how to use the electronic devices to exchange information (e.g. digital business card) promptly has become a significant issue.

SUMMARY OF THE INVENTION

The invention provides an information exchange method and an information exchange system capable of exchanging information promptly by shaking two electronic devices simultaneously, so as to solve the aforesaid problems.

According to the claimed invention, an information exchange method comprises steps of shaking a first electronic device and a second electronic device simultaneously; recording a first vibration waveform of the first electronic device and recording a second vibration waveform of the second electronic device; determining whether the first vibration waveform and the second vibration waveform match each other; and transmitting a first information related to the first electronic device to the second electronic device when the first vibration waveform and the second vibration waveform match each other.

According to the claimed invention, the information exchange method further comprises step of transmitting a second information related to the second electronic device to the first electronic device when the first vibration waveform and the second vibration waveform match each other.

According to the claimed invention, the first information is stored in a server, the first electronic device and the second electronic device both communicate with the server, and the information exchange method further comprises steps of the first electronic device transmitting the first vibration waveform to the server and the second electronic device transmitting the second vibration waveform to the server; the server determining whether the first vibration waveform and the second vibration waveform match each other; and the server transmitting the first information to the second electronic device when the first vibration waveform and the second vibration waveform match each other.

According to the claimed invention, the server further stores a second information related to the second electronic device and the information exchange method further comprises step of the server transmitting the second information to the first electronic device when the first vibration waveform and the second vibration waveform match each other.

According to the claimed invention, the first information is stored in the first electronic device, the first electronic device and the second electronic device communicate with each other, and the information exchange method further comprises steps of the second electronic device transmitting the second vibration waveform to the first electronic device; the first electronic device determining whether the first vibration waveform and the second vibration waveform match each other; and the first electronic device transmitting the first information to the second electronic device when the first vibration waveform and the second vibration waveform match each other.

According to the claimed invention, a second information is stored in the second electronic device and the information exchange method further comprises steps of the first electronic device transmitting the first vibration waveform to the second electronic device; the second electronic device determining whether the first vibration waveform and the second vibration waveform match each other; and the second electronic device transmitting the second information to the first electronic device when the first vibration waveform and the second vibration waveform match each other.

According to the claimed invention, the step of determining whether the first vibration waveform and the second vibration waveform match each other comprises steps of detecting N first characteristic points of the first vibration waveform and detecting N second characteristic points of the second vibration waveform, wherein N is a positive integer larger than one; calculating a first time interval between every two adjacent first characteristic points so as to obtain N−1 first time intervals and calculating a second time interval between every two adjacent second characteristic points so as to obtain N−1 second time intervals; calculating a time difference between each of the first time intervals and each of the second time intervals so as to obtain N−1 time differences; and determining that the first vibration waveform and the second vibration waveform match each other when each of the N−1 time differences is smaller than a first threshold.

According to the claimed invention, the step of determining whether the first vibration waveform and the second vibration waveform match each other further comprises steps of calculating an amplitude difference between the first vibration waveform, which is intercepted from the first first characteristic point to the N-th first characteristic point, and the second vibration waveform, which is intercepted from the first second characteristic point to the N-th second characteristic point, when each of the N−1 time differences is smaller than the first threshold; and determining that the first vibration waveform and the second vibration waveform match each other when the amplitude difference is smaller than a second threshold.

According to the claimed invention, the N first characteristic points comprise peaks, valleys, or combination thereof, and the N second characteristic points comprise peaks, valleys, or combination thereof.

According to the claimed invention, an information exchange system comprises a first electronic device; a second electronic device; and a server storing a first information related to the first electronic device, the first electronic device and the second electronic device both communicating with the server; wherein when the first electronic device and the second electronic device are shaken simultaneously, the first electronic device records a first vibration waveform and transmits the first vibration waveform to the server and the second electronic device records a second vibration waveform and transmits the second vibration waveform to the server; the server determines whether the first vibration waveform and the second vibration waveform match each other; and the server transmits the first information to the second electronic device when the first vibration waveform and the second vibration waveform match each other.

According to the claimed invention, the server further stores a second information related to the second electronic device and the server transmits the second information to the first electronic device when the first vibration waveform and the second vibration waveform match each other.

According to the claimed invention, the server detects N first characteristic points of the first vibration waveform and detects N second characteristic points of the second vibration waveform, wherein N is a positive integer larger than one; the server calculates a first time interval between every two adjacent first characteristic points so as to obtain N−1 first time intervals and calculates a second time interval between every two adjacent second characteristic points so as to obtain N−1 second time intervals; the server calculates a time difference between each of the first time intervals and each of the second time intervals so as to obtain N−1 time differences; and the server determines that the first vibration waveform and the second vibration waveform match each other when each of the N−1 time differences is smaller than a first threshold.

According to the claimed invention, the server calculates an amplitude difference between the first vibration waveform, which is intercepted from the first first characteristic point to the N-th first characteristic point, and the second vibration waveform, which is intercepted from the first second characteristic point to the N-th second characteristic point, when each of the N−1 time differences is smaller than the first threshold; and the server determines that the first vibration waveform and the second vibration waveform match each other when the amplitude difference is smaller than a second threshold.

According to the claimed invention, the N first characteristic points comprise peaks, valleys, or combination thereof, and the N second characteristic points comprise peaks, valleys, or combination thereof.

According to the claimed invention, an information exchange system comprises a first electronic device storing a first information; and a second electronic device communicating with the first electronic device; wherein when the first electronic device and the second electronic device are shaken simultaneously, the first electronic device records a first vibration waveform and the second electronic device records a second vibration waveform and transmits the second vibration waveform to the first electronic device; the first electronic device determines whether the first vibration waveform and the second vibration waveform match each other; and the first electronic device transmits the first information to the second electronic device when the first vibration waveform and the second vibration waveform match each other.

According to the claimed invention, the first electronic device detects N first characteristic points of the first vibration waveform and detects N second characteristic points of the second vibration waveform, wherein N is a positive integer larger than one; the first electronic device calculates a first time interval between every two adjacent first characteristic points so as to obtain N−1 first time intervals and calculates a second time interval between every two adjacent second characteristic points so as to obtain N−1 second time intervals; the first electronic device calculates a time difference between each of the first time intervals and each of the second time intervals so as to obtain N−1 time differences; and the first electronic device determines that the first vibration waveform and the second vibration waveform match each other when each of the N−1 time differences is smaller than a first threshold.

According to the claimed invention, the first electronic device calculates an amplitude difference between the first vibration waveform, which is intercepted from the first first characteristic point to the N-th first characteristic point, and the second vibration waveform, which is intercepted from the first second characteristic point to the N-th second characteristic point, when each of the N−1 time differences is smaller than the first threshold; and the first electronic device determines that the first vibration waveform and the second vibration waveform match each other when the amplitude difference is smaller than a second threshold.

According to the claimed invention, the N first characteristic points comprise peaks, valleys, or combination thereof, and the N second characteristic points comprise peaks, valleys, or combination thereof.

According to the claimed invention, the second electronic device stores a second information, when the first electronic device and the second electronic device are shaken simultaneously, the first electronic device records the first vibration waveform and transmits the first vibration waveform to the second electronic device and the second electronic device records the second vibration waveform; the second electronic device determines whether the first vibration waveform and the second vibration waveform match each other; and the second electronic device transmits the second information to the first electronic device when the first vibration waveform and the second vibration waveform match each other.

According to the claimed invention, the second electronic device detects N first characteristic points of the first vibration waveform and detects N second characteristic points of the second vibration waveform, wherein N is a positive integer larger than one; the second electronic device calculates a first time interval between every two adjacent first characteristic points so as to obtain N−1 first time intervals and calculates a second time interval between every two adjacent second characteristic points so as to obtain N−1 second time intervals; the second electronic device calculates a time difference between each of the first time intervals and each of the second time intervals so as to obtain N−1 time differences; and the second electronic device determines that the first vibration waveform and the second vibration waveform match each other when each of the N−1 time differences is smaller than a first threshold.

According to the claimed invention, the second electronic device calculates an amplitude difference between the first vibration waveform, which is intercepted from the first first characteristic point to the N-th first characteristic point, and the second vibration waveform, which is intercepted from the first second characteristic point to the N-th second characteristic point, when each of the N−1 time differences is smaller than the first threshold; and the second electronic device determines that the first vibration waveform and the second vibration waveform match each other when the amplitude difference is smaller than a second threshold.

According to the claimed invention, the N first characteristic points comprise peaks, valleys, or combination thereof, and the N second characteristic points comprise peaks, valleys, or combination thereof.

As mentioned in the above, a user only has to stack two electronic devices with each other and shakes the two electronic devices simultaneously so as to exchange information (e.g. digital business cards, video/audio files, photos etc.) promptly. The invention may utilize a vibration sensor (e.g. g sensor) embedded in the electronic device to sense the vibration waveform of the electronic device without raising additional cost. Furthermore, the probability of making a mistake will decrease effectively by the comparison between the time intervals of the characteristic points and the comparison of the amplitude difference between the vibration waveforms.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
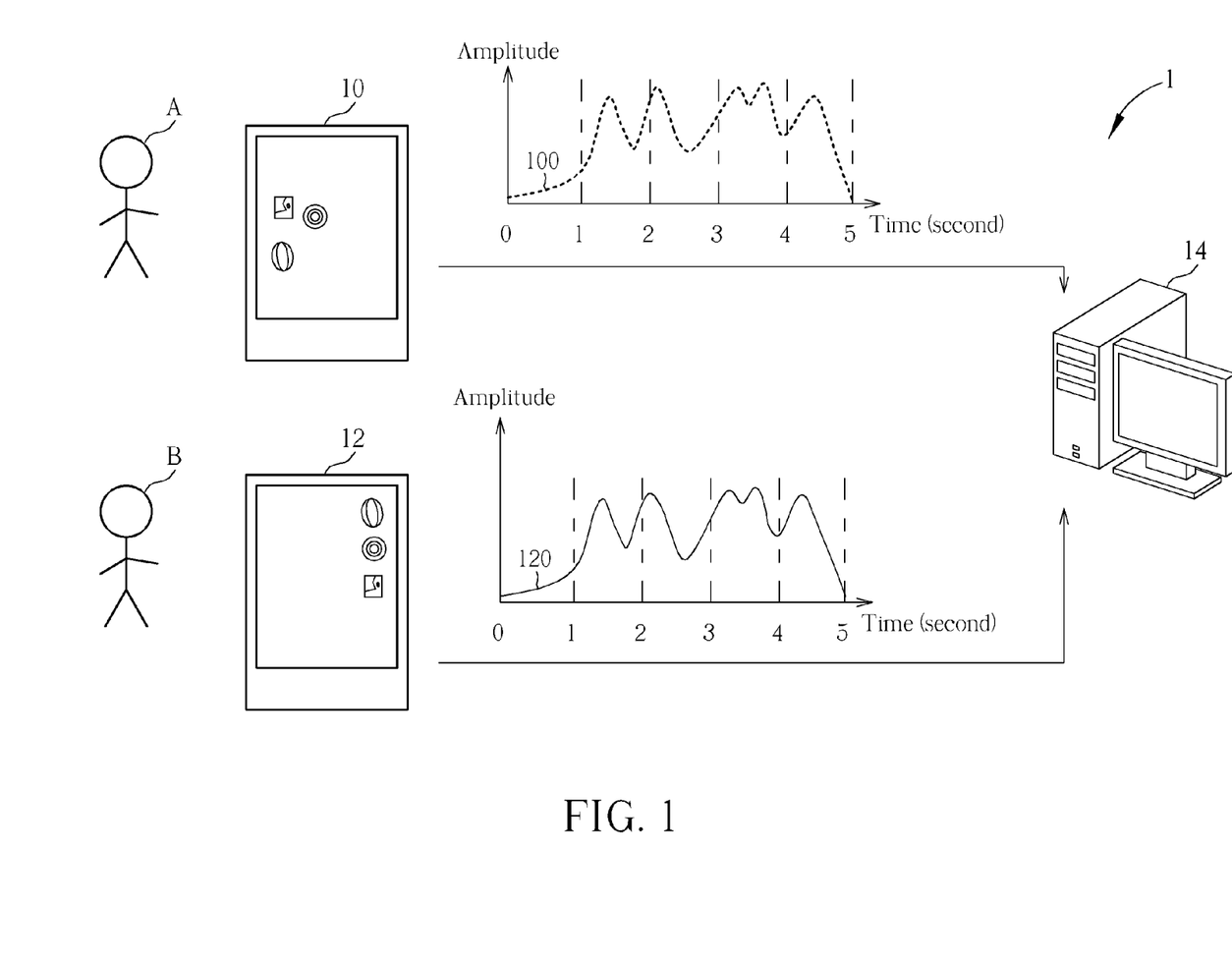
FIG. 1 is a schematic diagram illustrating an information exchange system according to an embodiment of the invention.
Figure 2:
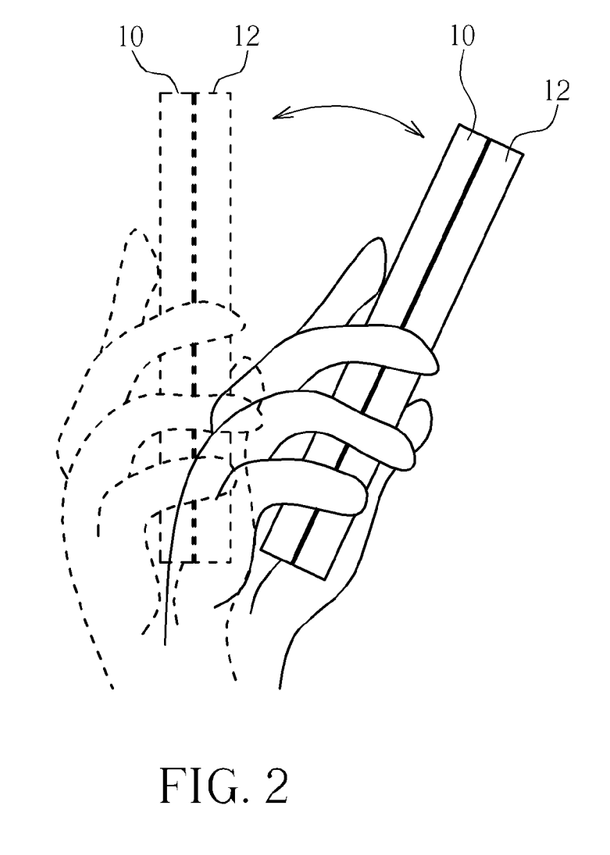
FIG. 2 is a schematic diagram illustrating the first electronic device and the second electronic device shown in FIG. 1 being stacked with each other and shaken simultaneously.
Figure 3:
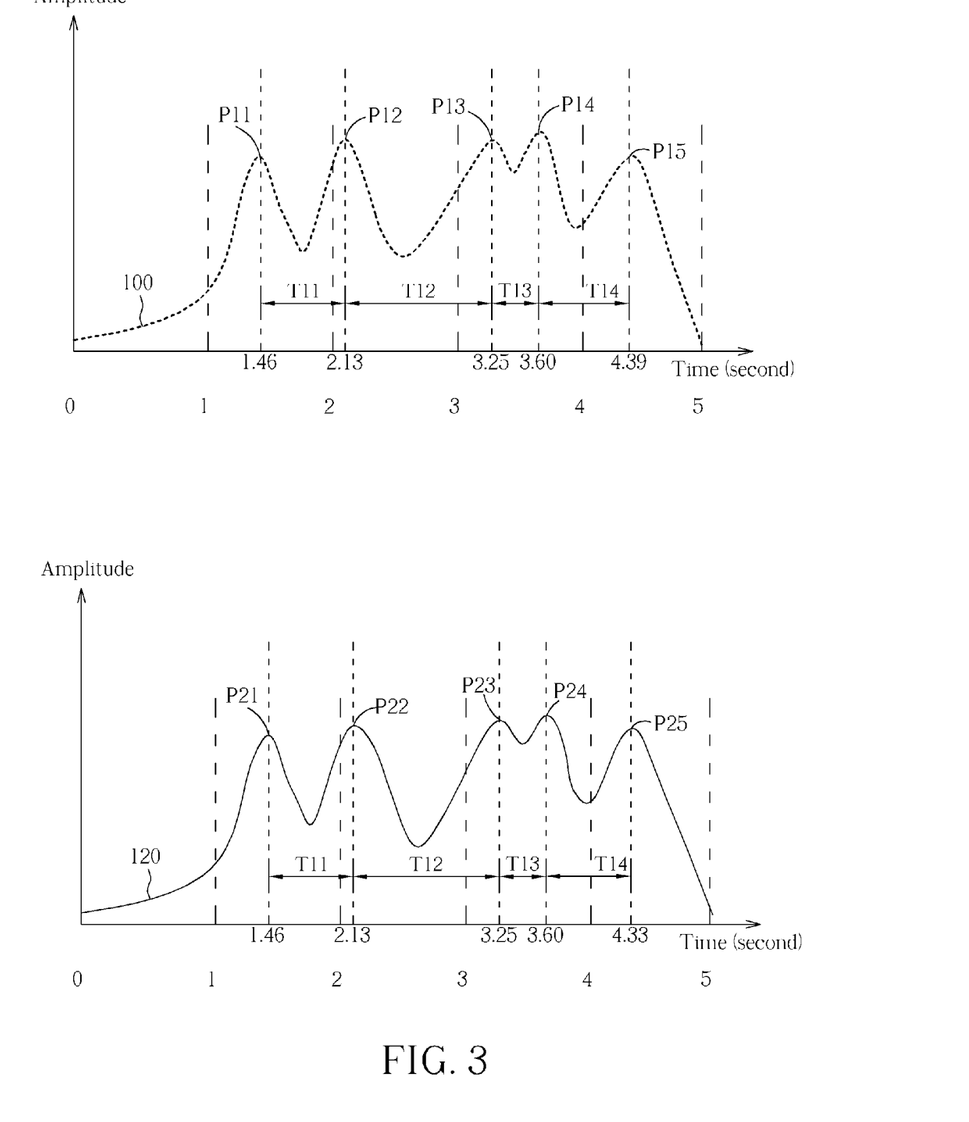
FIG. 3 is a schematic diagram illustrating the first vibration waveform recorded by the first electronic device and the second vibration waveform recorded by the second electronic device.
Figure 4:
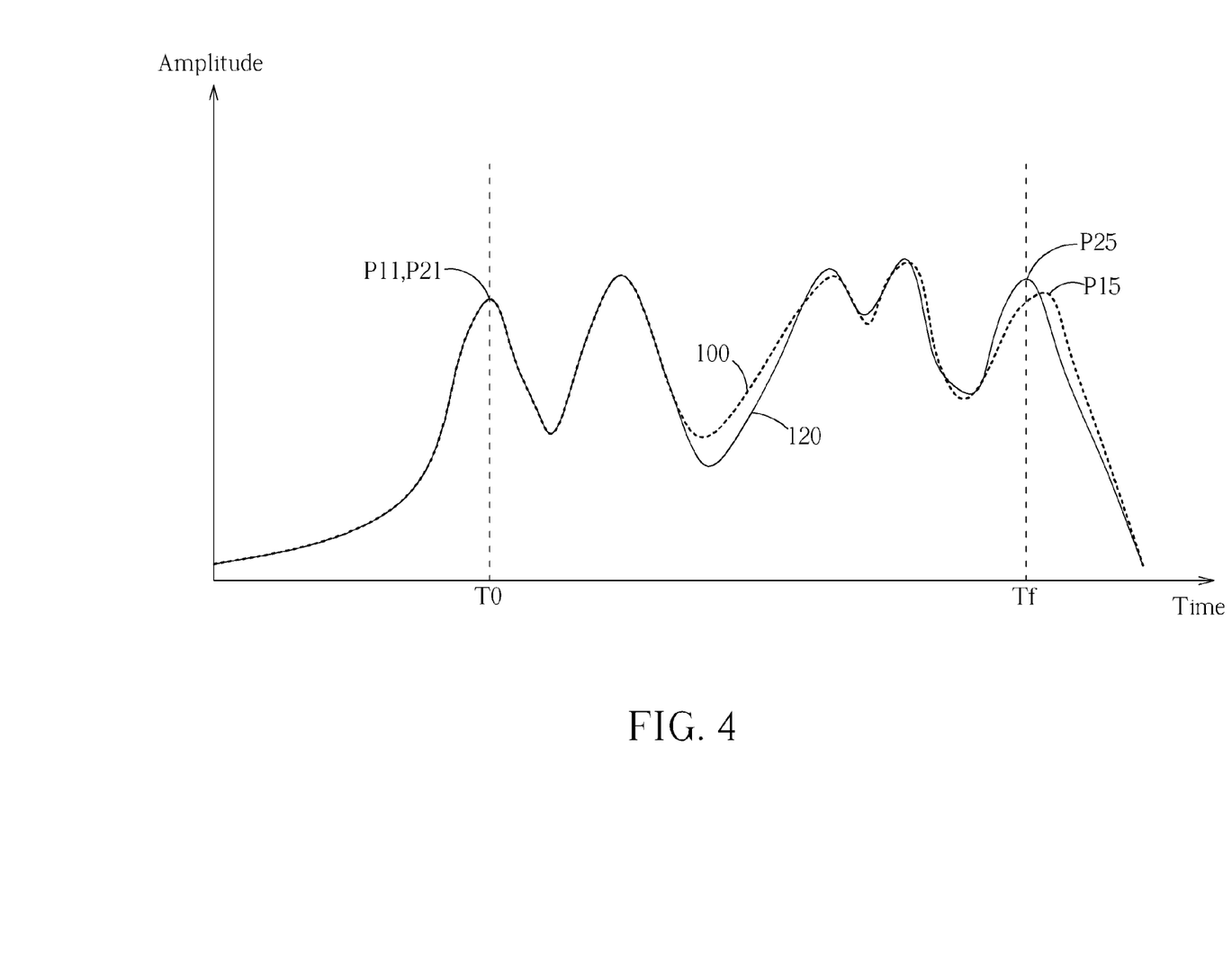
FIG. 4 is a schematic diagram illustrating the first vibration waveform and the second vibration waveform shown in FIG. 3 being stacked with each other.
Figure 5:
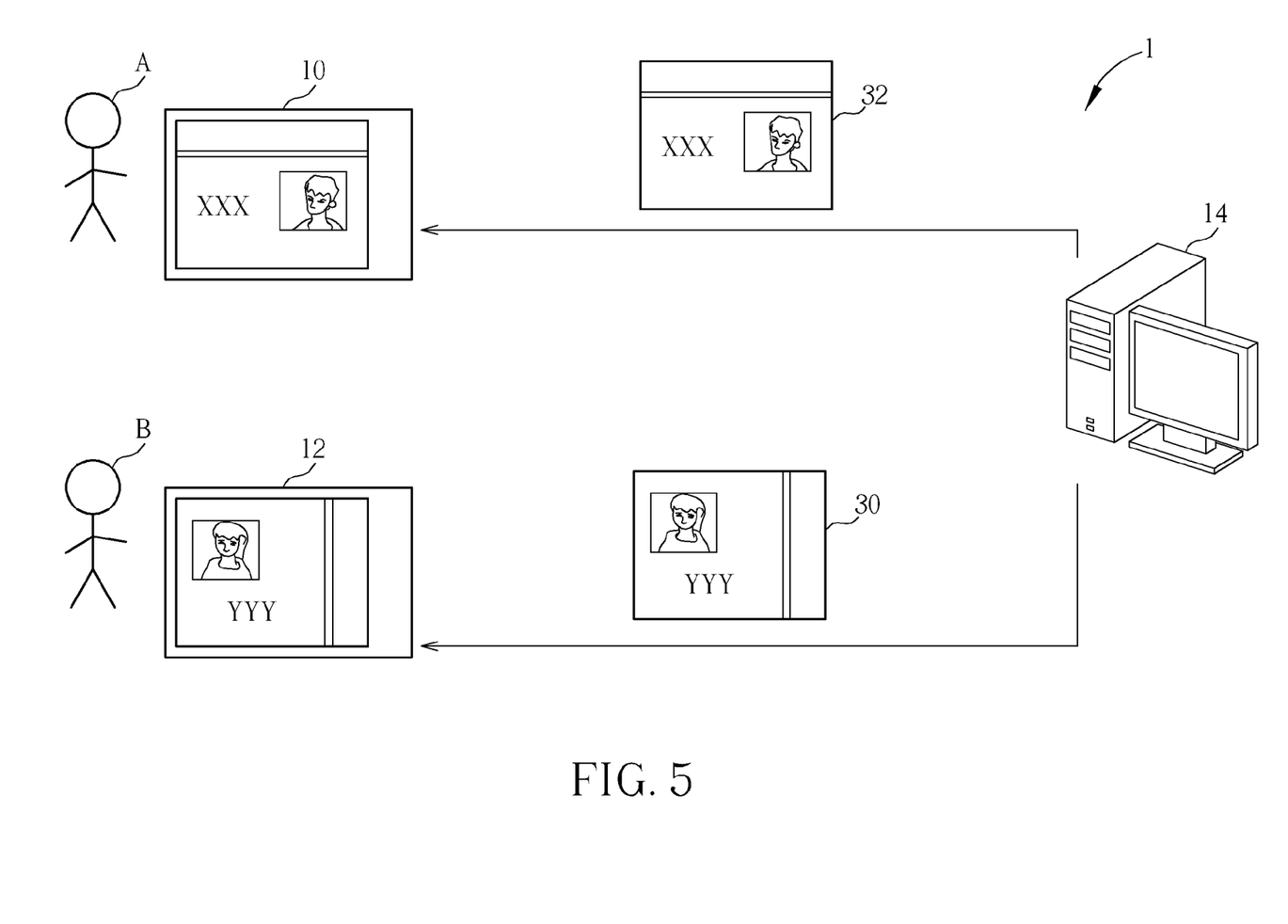
FIG. 5 is a schematic diagram illustrating the server transmitting the first information to the second electronic device and transmitting the second information to the first electronic device.
Figure 6:
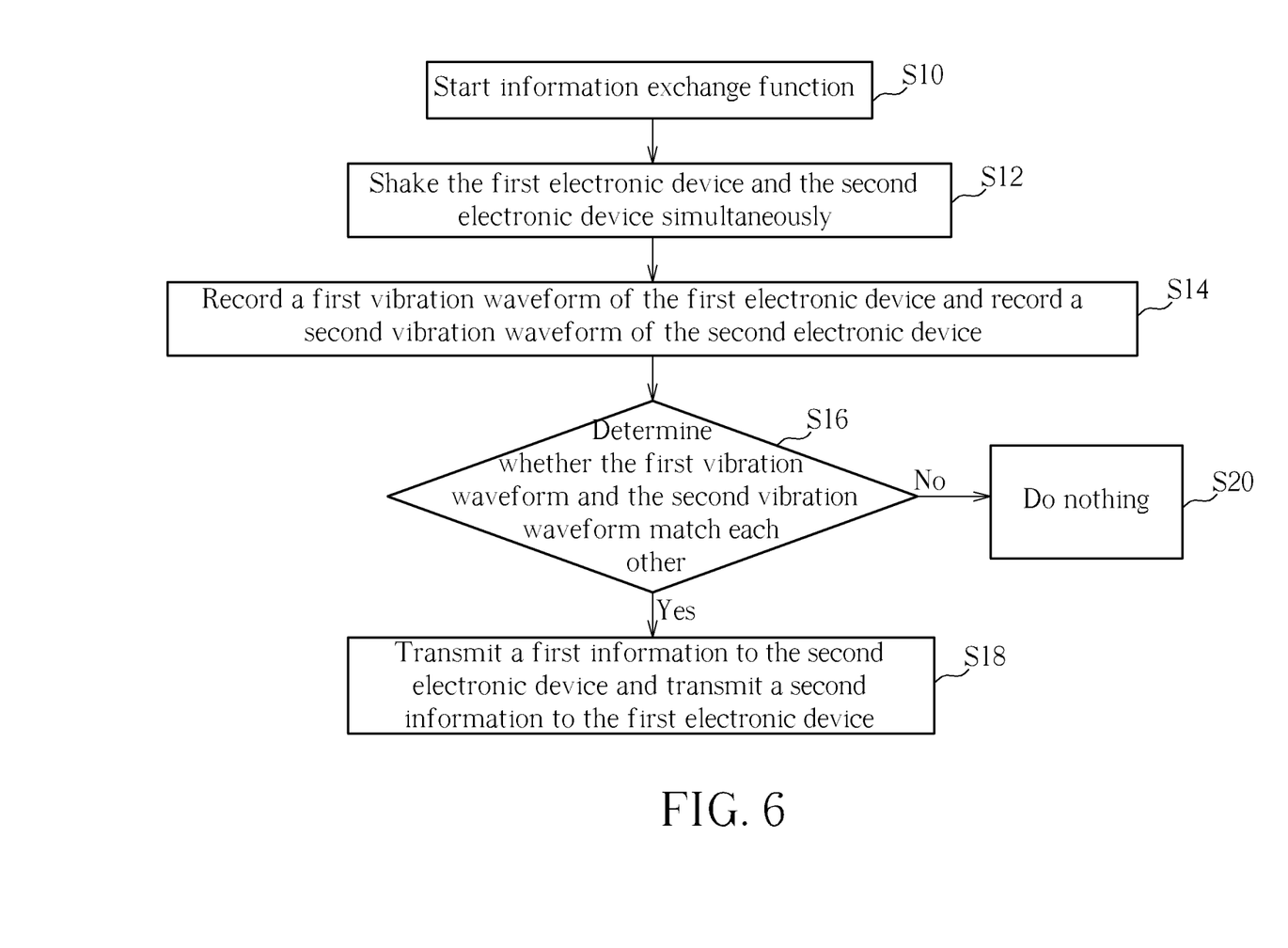
FIG. 6 is a flowchart illustrating an information exchange method according to an embodiment of the invention.
Figure 7:
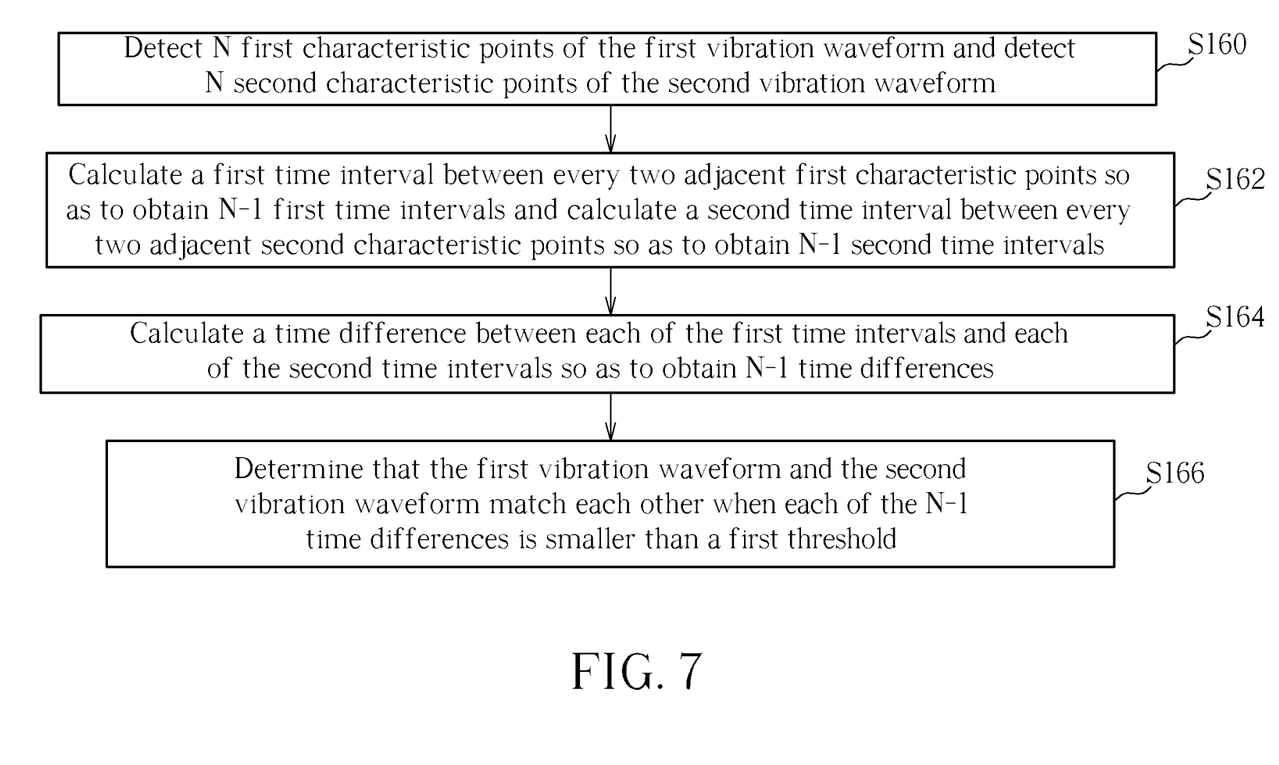
FIG. 7 is a flowchart illustrating the step S16 shown in FIG. 6 in detail.

Referring to FIGS. 1 to 7, FIG. 1 is a schematic diagram illustrating an information exchange system 1 according to an embodiment of the invention, FIG. 2 is a schematic diagram illustrating the first electronic device 10 and the second electronic device 12 shown in FIG. 1 being stacked with each other and shaken simultaneously, FIG. 3 is a schematic diagram illustrating the first vibration waveform 100 recorded by the first electronic device 10 and the second vibration waveform 120 recorded by the second electronic device 12, FIG. 4 is a schematic diagram illustrating the first vibration waveform 100 and the second vibration waveform 120 shown in FIG. 3 being stacked with each other, FIG. 5 is a schematic diagram illustrating the server 14 transmitting the first information 30 to the second electronic device 12 and transmitting the second information 32 to the first electronic device 10, FIG. 6 is a flowchart illustrating an information exchange method according to an embodiment of the invention, and FIG. 7 is a flowchart illustrating the step S16 shown in FIG. 6 in detail, wherein the information exchange method shown in FIG. 6 can be implemented by the information exchange system 1 shown in FIG. 1.

As shown in FIG. 1, the information exchange system 1 comprises a first electronic device 10, a second electronic device 12 and a server 14. The first electronic device 10 and the second electronic device 12 may be smart phones, personal digital assistants or other electronic devices equipped with vibration sensors (e.g. g sensor). As shown in FIG. 5, the server 14 stores a first information 30 related to the first electronic device 10 and a second information 32 related to the second electronic device 12. In this embodiment, the first information 30 may be a digital business card established and stored in the server 14 in advance by a user A of the first electronic device 10 and the second information 32 may be a digital business card established and stored in the server 14 in advance by a user B of the second electronic device 12. In another embodiment, the first information 30 may be also a video/audio file, a photo or other information that the user A wants to share with the user B and the second information 32 may be also a video/audio file, a photo or other information that the user B wants to share with the user A.

The first electronic device 10 and the second electronic device 12 both can communicate with the server 14 through wireless network (e.g. Wi-Fi, 3G/4G, etc.). When the user A and the user B want to exchange information by the first electronic device 10 and the second electronic device 12, the user A and the user B have to start an information exchange function of the invention on the first electronic device 10 and the second electronic device 12, as shown in step S10 of FIG. 6. Afterward, the user A or the user B has to stack the first electronic device 10 and the second electronic device 12 with each other and then shakes them simultaneously, as shown in FIG. 2 and step S12 of FIG. 6.

When the first electronic device 10 and the second electronic device 12 are shaken simultaneously, the first electronic device 10 senses and records a first vibration waveform 100 within a time period by the built-in vibration sensor and the second electronic device 12 senses and records a second vibration waveform 120 within a time period by the built-in vibration sensor, as shown in FIG. 3 and step S14 of FIG. 6. The aforesaid time period may be set as three seconds, five seconds, and so on based on practical applications and may be counted when the information exchange function is started. As shown in FIG. 3, the aforesaid time period is set as five seconds. Afterward, the first electronic device 10 transmits the first vibration waveform 100 to the server 14 and the second electronic device 12 transmits the second vibration waveform 120 to the server 14.

Then, the server 14 determines whether the first vibration waveform 100 and the second vibration waveform 120 match each other, as shown in step S16 of FIG. 6. The server 14 will transmit the first information 30 to the second electronic device 12 and transmit the second information 32 to the first electronic device 10 when the server 14 determines that the first vibration waveform 100 and the second vibration waveform 120 match each other, as shown in FIG. 5 and step S18 of FIG. 6. On the other hand, the server 14 will do nothing when the server 14 determines that the first vibration waveform 100 and the second vibration waveform 120 do not match each other, as shown in step S20 of FIG. 6.

FIGS. 3 and 7 will be used to describe how the server 14 determines whether the first vibration waveform 100 and the second vibration waveform 120 match each other in detail.

As shown in step S160 of FIG. 7, the server 14 detects N first characteristic points of the first vibration waveform 100 and detects N second characteristic points of the second vibration waveform 120 after receiving the first vibration waveform 100 and the second vibration waveform 120, wherein N is a positive integer larger than one. As shown in FIG. 3, the server 14 detects five first characteristic points P11-P15 of the first vibration waveform 100 and detects five second characteristic points P21-P25 of the second vibration waveform 120 (i.e. N=5), wherein the first characteristic points P11-P15 are peaks of the first vibration waveform 100 and the second characteristic points P21-P25 are peaks of the second vibration waveform 120. However, in another embodiment, the aforesaid first characteristic points may be also valleys or a combination of peaks and valleys of the first vibration waveform 100 and the aforesaid second characteristic points may be also valleys or a combination of peaks and valleys of the second vibration waveform 120. In this embodiment, the time point of peak and/or valley may be detected by a difference between two adjacent amplitudes of the vibration waveform. For example, the peak can be obtained once the difference between two adjacent amplitudes changes from positive to negative and the valley can be obtained once the difference between two adjacent amplitudes changes from negative to positive.

Then, as shown in step S162 of FIG. 7, the server 14 calculates a first time interval between every two adjacent first characteristic points P11-P15 so as to obtain four first time intervals T11-T14 and calculates a second time interval between every two adjacent second characteristic points P21-P25 so as to obtain four second time intervals T21-T24. As shown in FIG. 3, the four first time intervals T11-T14 are 0.67 seconds, 1.12 seconds, 0.35 seconds and 0.79 seconds, respectively, and the four second time intervals T21-T24 are 0.67 seconds, 1.12 seconds, 0.35 seconds and 0.73 seconds, respectively.

Then, as shown in step S164 of FIG. 7, the server 14 calculates a time difference between each of the first time intervals T11-T14 and each of the second time intervals T21-T24 so as to obtain four time differences. For example, the time difference between the first time interval T11 and the second time interval T21 may be calculated by $$\frac{|T11 - T21|}{T11} * 100\%,$$

wherein the denominator may be also replaced by the second time interval T21 based on practical applications. Accordingly, the four time differences calculated by the server 14 will be 0%, 0%, 0% and 7.59%, respectively.

Finally, as shown in step S166 of FIG. 7, the server 14 determines that the first vibration waveform 100 and the second vibration waveform 120 match each other when each of the four time differences is smaller than a first threshold (e.g. 10%), otherwise determines that the first vibration waveform 100 and the second vibration waveform 120 do not match each other. The aforesaid first threshold is not limited to 10% and can be set based on practical applications.

Figure 8:
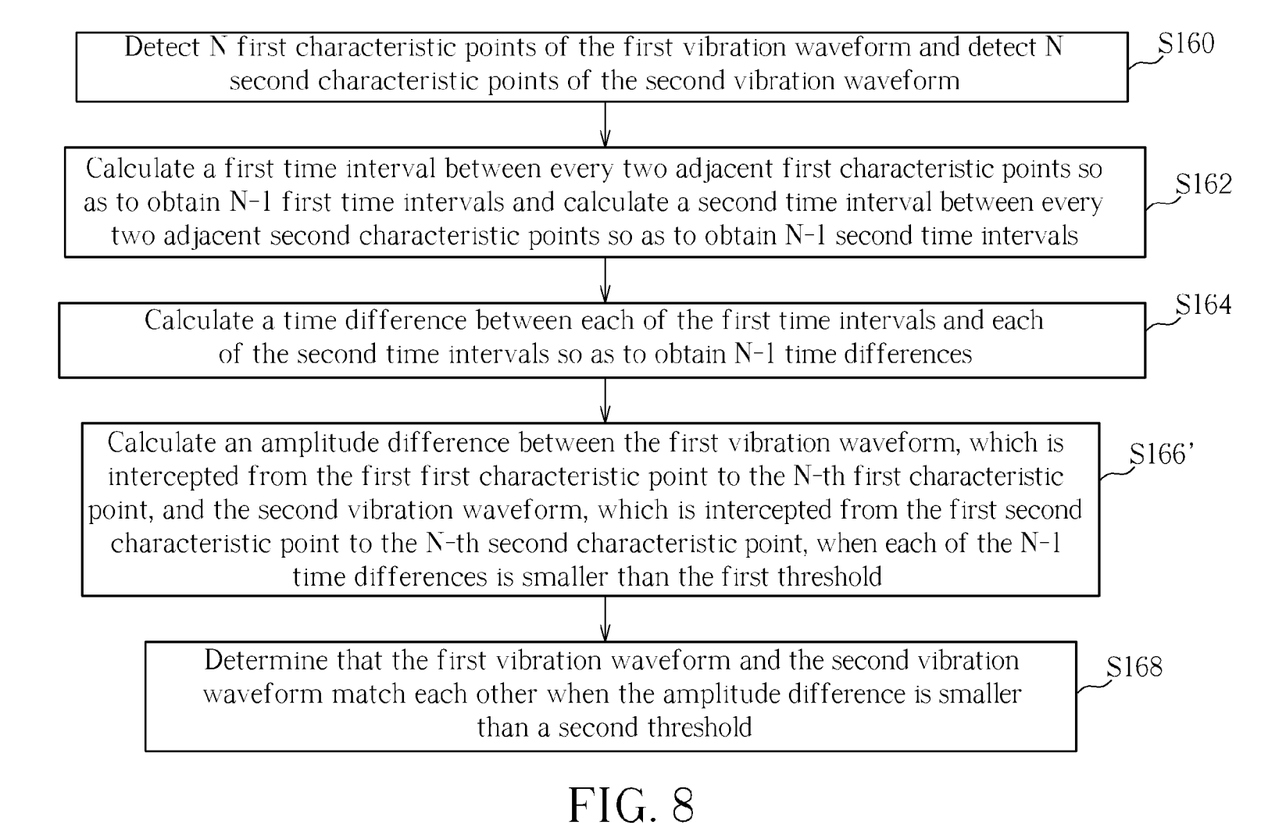
FIG. 8 is another flowchart illustrating the step S16 shown in FIG. 6 in detail.

Referring to FIGS. 4 and 8, FIG. 8 is another flowchart illustrating the step S16 shown in FIG. 6 in detail. The steps S160-S164 shown in FIG. 8 are the same as the steps S160-S164 shown in FIG. 7 and not depicted herein again. As shown in FIG. 4, when each of the four time differences is smaller than the first threshold (e.g. 10%), the server 14 stacks the first characteristic point P11 and the second characteristic point P21 with each other so as to stack the first vibration waveform 100 and the second vibration waveform 120 with each other. Afterward, as shown in step 166' of FIG. 8, the server 14 calculates an amplitude difference between the first vibration waveform 100, which is intercepted from the first first characteristic point P11 to the fifth first characteristic point P15, and the second vibration waveform 120, which is intercepted from the first second characteristic point P21 to the fifth second characteristic point P25.

For example, the aforesaid amplitude difference may be calculated by $$\frac{\sum_{T=T0}^{Tf} |A2(T) - A1(T)|}{\sum_{T=T0}^{Tf} A1(T)} * 100\%,$$

wherein T0 represents a time point with respect to the first characteristic point P11 and the second characteristic point P21 after being stacked, Tf represents a time point with respect to the first characteristic point P15 and the second characteristic point P25 after being stacked, A1(T) represents a function of time to amplitude of the first vibration waveform 100, and A2(T) represents a function of time to amplitude of the second vibration waveform 120. It should be noted that the denominator may be also replaced by $$\sum_{T=T0}^{Tf} A2(T)$$

based on practical applications. Furthermore, if the first characteristic point P15 and the second characteristic point P25 cannot be stacked with each other after stacking the first vibration waveform 100 and the second vibration waveform 120 with each other, the time point of the first characteristic point P15 or the time point of the second characteristic point P25 may be set to be the aforesaid time point Tf based on practical applications. The time point Tf shown in FIG. 4 is the time point of the second characteristic point P25.

Then, as shown in step S168 of FIG. 8, the server 14 determines that the first vibration waveform 100 and the second vibration waveform 120 match each other when the aforesaid amplitude difference is smaller than a second threshold (e.g. 5%), otherwise determines that the first vibration waveform 100 and the second vibration waveform 120 do not match each other. The aforesaid second threshold is not limited to 5% and can be set based on practical applications. The probability of making a mistake will decrease effectively by the comparison between the time intervals of the characteristic points and the comparison of the amplitude difference between the vibration waveforms.

Figure 9:
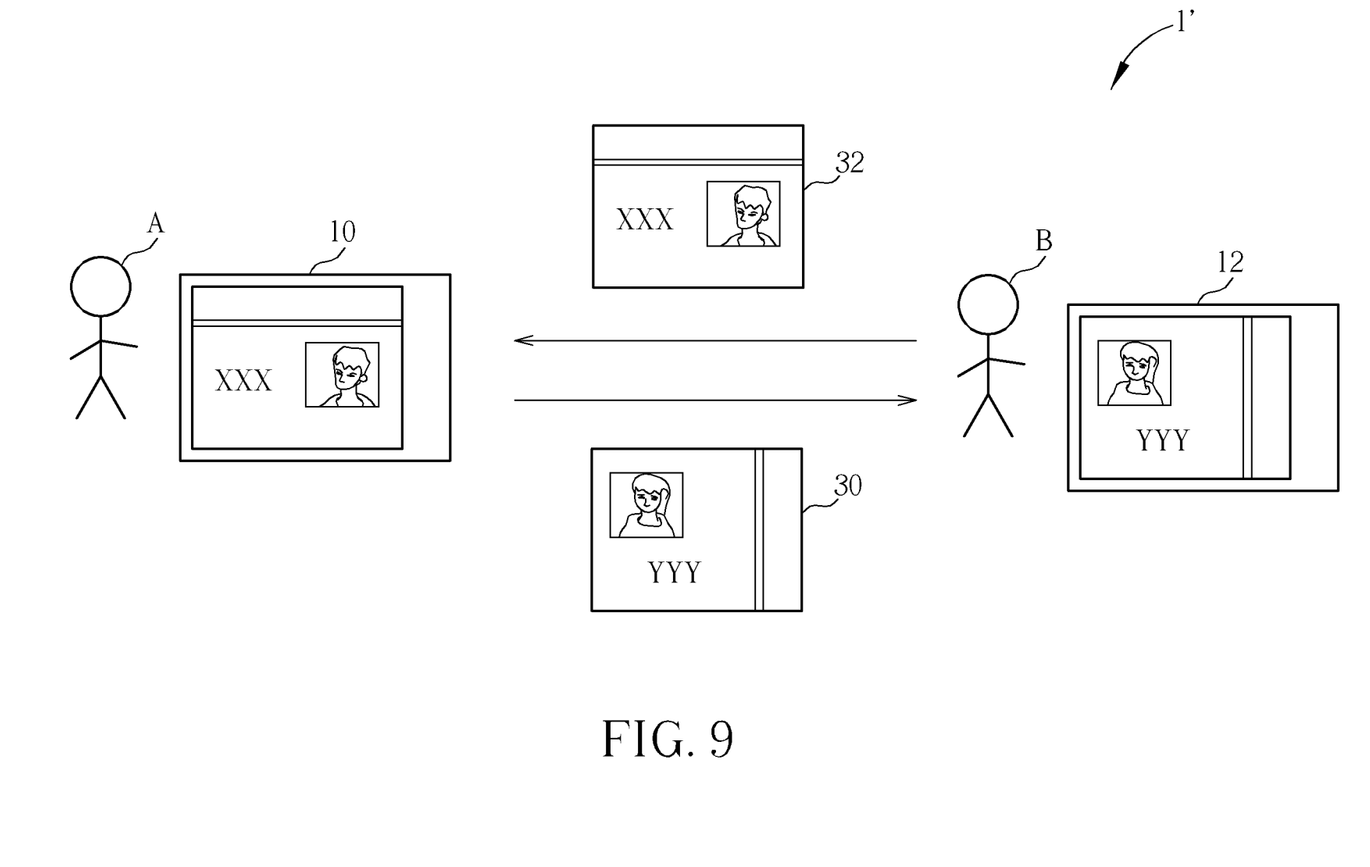
FIG. 9 is a schematic diagram illustrating an information exchange system according to another embodiment of the invention.

Referring to FIG. 9, FIG. 9 is a schematic diagram illustrating an information exchange system 1' according to another embodiment of the invention, wherein the information exchange method shown in FIG. 6 can be also implemented by the information exchange system 1' shown in FIG. 9. The main difference between the information exchange system 1' and the aforesaid information exchange system 1 is that the second electronic device 12 and the first electronic device 10 of the information exchange system 1' communicate with each other and can exchange information with each other immediately without the aforesaid server 14. In this embodiment, the second electronic device 12 and the first electronic device 10 may communicate with each other via Bluetooth, Wi-Fi Direct, Near Field Communication (NFC) or other transmission technology. In this embodiment, the first information 30 may be a digital business card established and stored in the first electronic device 10 in advance by a user A and the second information 32 may be a digital business card established and stored in the second electronic device 12 in advance by a user B. In another embodiment, the first information 30 may be also a video/audio file, a photo or other information that the user A wants to share with the user B and the second information 32 may be also a video/audio file, a photo or other information that the user B wants to share with the user A.

When the user A and the user B want to exchange information by the first electronic device 10 and the second electronic device 12, the user A and the user B have to start an information exchange function of the invention on the first electronic device 10 and the second electronic device 12, as shown in step S10 of FIG. 6. Afterward, the user A or the user B has to stack the first electronic device 10 and the second electronic device 12 with each other and then shakes them simultaneously, as shown in FIG. 2 and step S12 of FIG. 6.

When the first electronic device 10 and the second electronic device 12 are shaken simultaneously, the first electronic device 10 senses and records a first vibration waveform 100 within a time period by the built-in vibration sensor and the second electronic device 12 senses and records a second vibration waveform 120 within a time period by the built-in vibration sensor, as shown in FIG. 3 and step S14 of FIG. 6. The aforesaid time period may be set as three seconds, five seconds, and so on based on practical applications and may be counted when the information exchange function is started. As shown in FIG. 3, the aforesaid time period is set as five seconds. Afterward, the second electronic device 12 may transmit the second vibration waveform 120 to the first electronic device 10 such that the first electronic device 10 can determine whether the first vibration waveform 100 and the second vibration waveform 120 match each other, as shown in step S16 of FIG. 6. It is reasonably expected that the first electronic device 10 may also transmit the first vibration waveform 100 to the second electronic device 12 such that the second electronic device 12 can determine whether the first vibration waveform 100 and the second vibration waveform 120 match each other, as shown in step S16 of FIG. 6.

When the first vibration waveform 100 and the second vibration waveform 120 match each other, the first electronic device 10 will transmit the first information 30 to the second electronic device 12 and the second electronic device 12 will transmit the second information 32 to the first electronic device 10, as shown in FIG. 9 and step S18 of FIG. 6.

In this embodiment, the first electronic device 10 and the second electronic device 12 can utilize the steps S160-S166 shown in FIG. 7 or the steps S160-S168 shown in FIG. 8 to determine whether the first vibration waveform 100 and the second vibration waveform 120 match each other. The principles of FIGS. 7 and 8 are mentioned in the above and not depicted herein again.

If the second electronic device 12 and the first electronic device 10 communicate with each other via Bluetooth, the first electronic device 10 and the second electronic device 12 may start Bluetooth automatically while the user A and the user B start the information exchange function on the first electronic device 10 and the second electronic device 12. After the first electronic device 10 and the second electronic device 12 find each other via Bluetooth, the first electronic device 10 and the second electronic device 12 will be connected to each other automatically and transmit the first vibration waveform 100 and the second vibration waveform 120 to each other. Then, the first electronic device 10 and the second electronic device 12 will determine whether the first vibration waveform 100 and the second vibration waveform 120 match each other by the aforesaid method to pair. After determining that the first vibration waveform 100 and the second vibration waveform 120 match each other, the first electronic device 10 and the second electronic device 12 will start to communicate with each other and exchange information. In other words, compared with the conventional Bluetooth, which has to input an identification code to complete connection, the invention can complete connection between the first electronic device 10 and the second electronic device 12 automatically by determining whether the first vibration waveform 100 and the second vibration waveform 120 match each other.

Furthermore, the control logic of the information exchange method shown in FIG. 6 and the control logics of the determination methods shown in FIGS. 7 and 8 can be implemented by software. It is reasonably expected that each part or function of the control logics may be implemented by software, hardware or the combination thereof. Moreover, the control logics can be embodied by a computer readable storage medium, wherein the computer readable storage medium stores instructions, which can be executed by an electronic device so as to generate control command for controlling the electronic device to execute corresponding function.

As mentioned in the above, a user only has to stack two electronic devices with each other and shakes the two electronic devices simultaneously so as to exchange information (e.g. digital business cards, video/audio files, photos etc.) promptly. The invention may utilize a vibration sensor (e.g. g sensor) embedded in the electronic device to sense the vibration waveform of the electronic device without raising additional cost. Furthermore, the probability of making a mistake will decrease effectively by the comparison between the time intervals of the characteristic points and the comparison of the amplitude difference between the vibration waveforms.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An information exchange method comprising:
a user stacking a first electronic device and a second electronic device with each other and shaking the first electronic device and the second electronic device simultaneously;
recording a first vibration waveform of the first electronic device and recording a second vibration waveform of the second electronic device;
determining whether the first vibration waveform and the second vibration waveform match each other; and
transmitting a first information related to the first electronic device to the second electronic device when the first vibration waveform and the second vibration waveform match each others;
wherein determining whether the first vibration waveform and the second vibration waveform match each other comprises:
detecting N first characteristic points of the first vibration waveform and detecting N second characteristic points of the second vibration waveform, wherein N is a positive integer larger than one;
calculating a first time interval between every two adjacent first characteristic points so as to obtain N−1 first time intervals and calculating a second time interval between every two adjacent second characteristic points so as to obtain N−1 second time intervals;
calculating a time difference between each of the first time intervals and each of the second time intervals so as to obtain N−1 time differences; and determining that the first vibration waveform and the second vibration waveform match each other when each of the N−1 time differences is smaller than a first threshold.

2. The information exchange method of claim 1, further comprising:
transmitting a second information related to the second electronic device to the first electronic device when the first vibration waveform and the second vibration waveform match each other.

3. The information exchange method of claim 1, wherein the first information is stored in a server, the first electronic device and the second electronic device both communicate with the server, the information exchange method further comprises:
the first electronic device transmitting the first vibration waveform to the server and the second electronic device transmitting the second vibration waveform to the server;
the server determining whether the first vibration waveform and the second vibration waveform match each other; and
the server transmitting the first information to the second electronic device when the first vibration waveform and the second vibration waveform match each other.

4. The information exchange method of claim 3, wherein the server further stores a second information related to the second electronic device, the information exchange method further comprises:
the server transmitting the second information to the first electronic device when the first vibration waveform and the second vibration waveform match each other.

5. The information exchange method of claim 1, wherein the first information is stored in the first electronic device, the first electronic device and the second electronic device communicate with each other, the information exchange method further comprises:
the second electronic device transmitting the second vibration waveform to the first electronic device;
the first electronic device determining whether the first vibration waveform and the second vibration waveform match each other; and
the first electronic device transmitting the first information to the second electronic device when the first vibration waveform and the second vibration waveform match each other.

6. The information exchange method of claim 5, wherein a second information is stored in the second electronic device, the information exchange method further comprises:
the first electronic device transmitting the first vibration waveform to the second electronic device;
the second electronic device determining whether the first vibration waveform and the second vibration waveform match each other; and
the second electronic device transmitting the second information to the first electronic device when the first vibration waveform and the second vibration waveform match each other.

7. The information exchange method of claim 1, wherein determining whether the first vibration waveform and the second vibration waveform match each other further comprises:
calculating an amplitude difference between the first vibration waveform, which is intercepted from the first first characteristic point to the N-th first characteristic point, and the second vibration waveform, which is intercepted from the first second characteristic point to the N-th second characteristic point, when each of the N−1 time differences is smaller than the first threshold; and
determining that the first vibration waveform and the second vibration waveform match each other when the amplitude difference is smaller than a second threshold.

8. The information exchange method of claim 1, wherein the N first characteristic points comprise peaks, valleys, or combination thereof, and the N second characteristic points comprise peaks, valleys, or combination thereof.

9. An information exchange system comprising:
a first electronic device;
a second electronic device; and
a server storing a first information related to the first electronic device, the first electronic device and the second electronic device both communicating with the server;
wherein when a user stacks the first electronic device and the second electronic device with each other and shakes the first electronic device and the second electronic device simultaneously, the first electronic device records a first vibration waveform and transmits the first vibration waveform to the server and the second electronic device records a second vibration waveform and transmits the second vibration waveform to the server; the server determines whether the first vibration waveform and the second vibration waveform match each other; and the server transmits the first information to the second electronic device when the first vibration waveform and the second vibration waveform match each others;
wherein the server detects N first characteristic points of the first vibration waveform and detects N second characteristic points of the second vibration waveform, wherein N is a positive integer larger than one the server calculates a first time interval between every two adjacent first characteristic points so as to obtain N−1 first time intervals and calculates a second time interval between every two adjacent second characteristic points so as to obtain N−1 second time intervals; the server calculates a time difference between each of the first time intervals and each of the second time intervals so as to obtain N−1 time differences; and the server determines that the first vibration waveform and the second vibration waveform match each other when each of the N−1 time differences is smaller than a first threshold.

10. The information exchange system of claim 9, wherein the server further stores a second information related to the second electronic device and the server transmits the second information to the first electronic device when the first vibration waveform and the second vibration waveform match each other.

11. The information exchange system of claim 9, wherein the server calculates an amplitude difference between the first vibration waveform, which is intercepted from the first first characteristic point to the N-th first characteristic point, and the second vibration waveform, which is intercepted from the first second characteristic point to the N-th second characteristic point, when each of the N−1 time differences is smaller than the first threshold; and the server determines that the first vibration waveform and the second vibration waveform match each other when the amplitude difference is smaller than a second threshold.

12. The information exchange system of claim 9, wherein the N first characteristic points comprise peaks, valleys, or combination thereof, and the N second characteristic points comprise peaks, valleys, or combination thereof.

13. An information exchange system comprising:
a first electronic device storing a first information; and
a second electronic device communicating with the first electronic device;
wherein when a user stacks the first electronic device and the second electronic device with each other and shakes the first electronic device and the second electronic device simultaneously, the first electronic device records a first vibration waveform and the second electronic device records a second vibration waveform and transmits the second vibration waveform to the first electronic device; the first electronic device determines whether the first vibration waveform and the second vibration waveform match each other; and the first electronic device transmits the first information to the second electronic device when the first vibration waveform and the second vibration waveform match each others;
wherein the first electronic device detects N first characteristic points of the first vibration waveform and detects N second characteristic points of the second vibration waveform, wherein N is a positive integer larger than one the first electronic device calculates a first time interval between every two adjacent first characteristic points so as to obtain N−1 first time intervals and calculates a second time interval between every two adjacent second characteristic points so as to obtain N−1 second time intervals; the first electronic device calculates a time difference between each of the first time intervals and each of the second time intervals so as to obtain N−1 time differences; and the first electronic device determines that the first vibration waveform and the second vibration waveform match each other when each of the N−1 time differences is smaller than a first threshold.

14. The information exchange system of claim 13, wherein the first electronic device calculates an amplitude difference between the first vibration waveform, which is intercepted from the first first characteristic point to the N-th first characteristic point, and the second vibration waveform, which is intercepted from the first second characteristic point to the N-th second characteristic point, when each of the N−1 time differences is smaller than the first threshold; and the first electronic device determines that the first vibration waveform and the second vibration waveform match each other when the amplitude difference is smaller than a second threshold.

15. The information exchange system of claim 13, wherein the N first characteristic points comprise peaks, valleys, or combination thereof, and the N second characteristic points comprise peaks, valleys, or combination thereof.

16. The information exchange system of claim 13, wherein the second electronic device stores a second information, when the first electronic device and the second electronic device are shaken simultaneously, the first electronic device records the first vibration waveform and transmits the first vibration waveform to the second electronic device and the second electronic device records the second vibration waveform; the second electronic device determines whether the first vibration waveform and the second vibration waveform match each other; and the second electronic device transmits the second information to the first electronic device when the first vibration waveform and the second vibration waveform match each other.

17. The information exchange system of claim 16, wherein the second electronic device detects N first characteristic points of the first vibration waveform and detects N second characteristic points of the second vibration waveform, wherein N is a positive integer larger than one; the second electronic device calculates a first time interval between every two adjacent first characteristic points so as to obtain N−1 first time intervals and calculates a second time interval between every two adjacent second characteristic points so as to obtain N−1 second time intervals; the second electronic device calculates a time difference between each of the first time intervals and each of the second time intervals so as to obtain N−1 time differences; and the second electronic device determines that the first vibration waveform and the second vibration waveform match each other when each of the N−1 time differences is smaller than a first threshold.

18. The information exchange system of claim 17, wherein the second electronic device calculates an amplitude difference between the first vibration waveform, which is intercepted from the first first characteristic point to the N-th first characteristic point, and the second vibration waveform, which is intercepted from the first second characteristic point to the N-th second characteristic point, when each of the N−1 time differences is smaller than the first threshold; and the second electronic device determines that the first vibration waveform and the second vibration waveform match each other when the amplitude difference is smaller than a second threshold.

19. The information exchange system of claim 17, wherein the N first characteristic points comprise peaks, valleys, or combination thereof, and the N second characteristic points comprise peaks, valleys, or combination thereof.

* * * * *